Sept. 14, 1937.   H. SONNENFELD   2,093,114

ELECTRIC CABLE AND METHOD OF INSTALLATION

Filed Aug. 31, 1935

INVENTOR
Hugo Sonnenfeld
BY
George J. Schottler
ATTORNEY

Patented Sept. 14, 1937

2,093,114

UNITED STATES PATENT OFFICE 2,093,114

ELECTRIC CABLE AND METHOD OF INSTALLATION

Hugo Sonnenfeld, Bratislava, Czechoslovakia, assignor to General Cable Corporation, New York, N. Y., a corporation of New Jersey Application August 31, 1935, Serial No. 38,722
In Czechoslovakia September 3, 1934

6 Claims. (Cl. 247—3)

This invention relates to electric cables and cable systems, and more particularly to cables which are surrounded by a rigid tube or pipe. There are known non-leaded types of insulated cables which are drawn into a mechanically rigid tube system and are thereafter placed under a liquid or gas pressure which causes an increase in the resistance of the insulating medium to electric breakdown. Three main difficulties are noted therewith: one, the insulated cables must be protected from damaging external influences between the time of finishing in the factory and the time of installation in the tubular system; two, they must be protected against mechanical damage during installation in the tubular system; and, three, every remnant of dampness and dirt must be eliminated from the tube before installation of the insulated cables therein.

An object of the present invention is to provide the insulated cables which are to be installed in the tube with a common liquid and gas-tight protective sheath which protects the cables against physical, chemical and mechanical damage after manufacture, during transportation, and during the installation process. Another object of the invention is to provide an improved method of installation, in which the pressure medium is introduced between the insulated cables and the inside surface of the protective sheath after the drawing-in process has taken place. Other objects and advantages of the invention will appear hereinafter.

An embodiment of the invention selected merely for purposes of illustration is shown in the accompanying drawing, in which.

Figure 1:
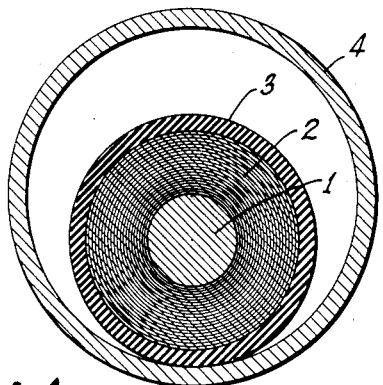
Figs. 1 and 2 show two embodiments of the cable before introduction of the pressure medium.

According to this invention, the protective sheath is designed and constructed so that either due to the elasticity of the material of which it is made, or due to the longitudinal folds in the sheath, the sheath expands upon the application of the internal pressure until its exterior wall surface more or less completely engages the interior wall surface of the tube, so that it lines the latter. Elastic materials such as rubber, gutta percha, balata or the oil resistant plastic compound known as "thiokol", or similar materials are particularly suitable as materials for the protective sheath. However, artificial silk, "cellophane", cellulose-esters, or lead, or such materials as are suitable can be applied in the factory, in known manner, as a seamless sheath over the insulated cables. With the last named materials of lesser elastic nature, the sheath desirably will be provided with longitudinal folds, forming waves, in cross section. These folds give the protective sheath such a large circumference after the unfolding of the folds that the sheath can lay itself well against the inside wall of the tube so that it lines the tube. Desirably the folds are in such number and of such size that the lining of the rigid tube is complete after the opening up of the protective sheath under the influence of the liquid or gas pressure used.

It may be desirable to evacuate the rigid tube before the introduction of the pressure medium into the sheathed cable in order that the air in the tube may not prevent a close lining of the tube by the sheath.

The material for the making of the pressure sheath should be chosen in such a manner that no unfavorable physical or chemical reaction or influence occurs between the pressure medium and the inside wall of the protective sheath. If, for instance, the pressure medium is oil, "thiokol" or lead will be suitable as material for the protective sheath, or else rubber with a thin interior "thiokol" lining. If the pressure medium is a gas, material such as "cellophane", rubber or the like may also be used.

If desired, the exterior wall of the protective sheath, may be provided with longitudinal ribs to take care of the scraping during the drawing-in process. In that case the protective sheath, after its expansion, may not lie with its outside surface in complete engagement with the inside surface of the tube. It may be that only the remaining portions of the ribs which were not scraped off during installation contact with the tube wall, or, depending upon the elasticity of the sheath material and the magnitude of the pressure, other parts of the protective sheath itself may engage the tube wall.

The protective sheath may be applied in the factory closely surrounding the insulated cables, or with some play. The conductor insulation may be impregnated in the factory, or after the drawing of the sheathed cable into the tube. Either a liquid or gaseous filling medium may be employed.

Figure 2:
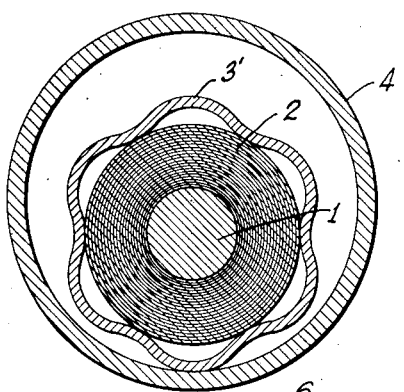
Figure 4:
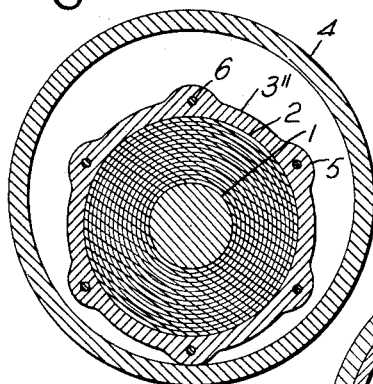
Fig. 4 shows another embodiment of the cable before introduction of the pressure medium.
Figure 5:
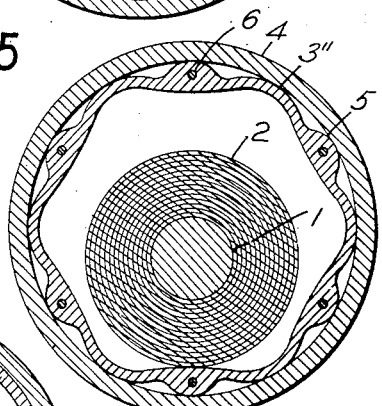
Fig. 5 shows the cable of Fig. 4 after the sheath has been expanded.
Figure 3:
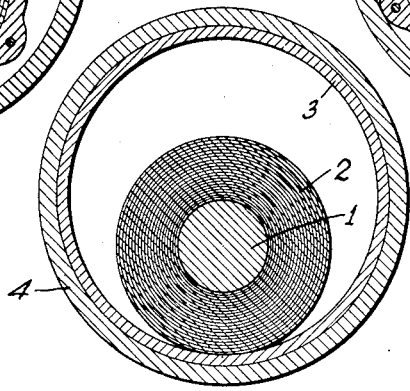
Fig. 3 shows the cable after the sheath has been expanded to line the rigid tube.

In Fig. 1 the cable conductor 1, enveloped in a covering 2 of insulation and an elastic sheath 3 is drawn into the rigid pipe 4. Fig. 2 is similar to Fig. 1 except that instead of the close fitting elastic sheath 3 there is the sheath 3' having longitudinal folds giving a wave shape. Fig. 3 shows the cable after introduction of the pressure medium and expansion of the cable sheath 3 to line the pipe 4. Fig. 4 is similar to Fig. 1 except that the protective sheath 3'' is provided with longitudinal ribs 5, as described above, and with heat conductive members 6, which will be referred to more particularly hereinafter. Fig. 5 shows the cable of Fig. 4 after introduction of the pressure medium and expansion of the sheath 3'' until it engages the pipe 4.

If the protective sheath consists of a suitable insulating material it acts as a spacing means between the insulated conductors and the tube system, whereby the transmission voltage may be increased. Ribs on the exterior wall surface of the protective sheath, such as described above, increase this effect.

If the protective sheath consists of a material which has low heat conductivity, heat conductive wires, spirals, or bands 6 can be embedded in the interior surface of the protective sheath or in the wall of the same, in the longitudinal direction, so that the protective sheath is able to expand easily in spite of these inlays.

If desired, not only insulated conductors but also lead covered cables may be provided with an expansible protective sheath which lays itself against the inside wall surface of the tube system when the pressure is applied between the cable and the sheath. In such a cable system the pressure medium does not act directly upon the conductor insulation, but through a liquid resisting membrane which separates the insulation and the pressure medium, and even if this membrane, which is exposed to breathing movements, should break, the insulating medium is not polluted from the side of the tube line.

If the protective sheath according to the invention is made of insulating material, one also obtains, due to the space, an increase of the transmittable voltage.

In general the protective sheath according to the invention has also the advantage after having laid itself against the inside wall of the tube, that it closes any possible small leaks in the tube line.

If the protective sheath consists of a material which glides poorly against the inside wall of the tube lining, the exterior wall of the protective sheath can be metallized in a suitable manner, or provided with a lubricating layer such as graphite, soap, or the like. It is of no importance that this layer breaks after the protective sheath has expanded.

It will be understood that the invention may be variously modified and embodied within the scope of the subjoined claims.

I claim:

1. A power cable system, comprising in combination, a rigid pressure resisting tube, an insulated conductor therein, an expansible sheath surrounding said conductor within said tube, and a fluid medium under pressure between said conductor and said sheath for maintaining said sheath in expanded condition so that it is substantially of the same size as the interior of said tube.

2. A power cable system, comprising in combination, a rigid pressure resisting tube, an insulated conductor therein, an expansible sheath of elastic material surrounding said conductor within said tube, and a fluid medium under pressure between said conductor and said sheath for maintaining said sheath in expanded condition so that it is substantially of the same size as the interior of said tube.

3. A power cable system, comprising in combination, a rigid pressure resisting tube, an insulated conductor therein, an expansible sheath surrounding said conductor within said tube, said sheath being provided with circumferential folds which permit expansion without rupture thereof, and a fluid medium under pressure between said conductor and said sheath for maintaining said sheath in expanded condition so that it is substantially of the same size as the interior of said tube.

4. A power cable system, comprising in combination, a rigid pressure resisting tube, an insulated conductor therein, an expansible sheath surrounding said conductor within said tube, said sheath being formed of a material which is a poor conductor of heat and being provided with longitudinally extending and circumferentially spaced heat conducting elements, and a fluid medium under pressure between said conductor and said sheath for maintaining said sheath in expanded condition so that it is substantially of the same size as the interior of said tube.

5. A power cable system, comprising in combination, a rigid pressure resisting tube, an insulated conductor therein, an expansible sheath surrounding said conductor within said tube, said sheath being provided on its exterior surface with longitudinal ribs, and a fluid medium under pressure between said conductor and said sheath for maintaining said sheath in expanded condition so that it is substantially of the same size as the interior of said tube.

6. The process of installing a power cable system which includes a rigid pressure resisting tube, and an insulated conductor provided with an expansible sheath, which process comprises, drawing said sheathed conductor into said tube, and supplying fluid under pressure between said conductor and its sheath to expand said sheath until it is substantially of the same size as the interior of said tube.

HUGO SONNENFELD.